United States Patent Office 3,283,020
Patented Nov. 1, 1966

3,283,020
PROCESS FOR THE PRODUCTION OF PERFLUOROETHYLIODIDE
Raymond E. Parsons, Wilmington, Del., assignor to E. I. du Pont de Nemours and Company, Wilmington, Del., a corporation of Delaware
No Drawing. Filed Dec. 20, 1962, Ser. No. 246,023
7 Claims. (Cl. 260—653)

This invention relates to a process for preparing perfluoroethyl iodide.

The prior art describes several methods for preparing perfluoroethyl iodide. For example, U.S. Patent 2,614,131 discloses the preparation of this compound by heating a vaporous mixture of iodine pentafluoride and tetrafluoroethylene at 175°–250° C. Another pertinent patent is U.S. 3,006,973 which discloses the preparation of perfluoroethyl iodide by reacting tetrafluoroethylene with a mixture of iodine pentafluoride and iodine in the presence of an aluminum catalyst. Also, Haszeldine et al. in J. Chem. Soc. (London), 1548. (1953), disclose the reaction of 1,2-diiodotetrafluoroethane with iodine pentafluoride to form perfluoroethyl iodide. The reaction is reported to proceed well at 90° C.

The present invention provides a unique, alternative method for the production of perfluoroethyl iodide and, if desired, higher perfluoroalkyl iodides containing up to 20 carbon atoms. This process is a catalyzed reaction which employs a different combination of reactants than prior art processes. More specifically, this invention is concerned with a process for preparing perfluoroalkyl iodides by reacting 1,2-diiodotetrafluoroethane (also referred to herein as "diiodide"), tetrafluoroethylene, and iodine pentafluoride in the presence of a catalyst selected from the group consisting of (1) antimony pentafluoride, and (2) a mixture of antimony trifluoride and iodine. Reaction temperatures are in the range of about 0°–120° C., and a temperature range of 60°–80° C. is preferred.

In the broad aspect of this invention, reacting proportions are not critical. Reaction will take place to produce perfluoroethyl iodide regardless of the proportions as long as all three reactants are present in the reaction system along with small amounts of the antimony-containing catalyst. The reaction which is considered to take place is as follows:

Equation 1

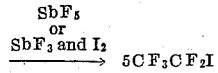

$$2ICF_2CF_2I + IF_5 + 3CF_2=CF_2 \xrightarrow{SbF_5 \text{ or } SbF_3 \text{ and } I_2} 5CF_3CF_2I$$

In carrying out the present invention, it has been found that if the 1,2-diiodotetrafluoroethane is used up, and iodine pentafluoride and tetrafluoroethylene are still present, reaction will take place to produce longer-chain perfluoroalkyl iodides containing up to 20 carbon atoms. The chain length of these higher perfluoroalkyl iodides is dependent upon the amount of tetrafluoroethylene which is in the reaction zone or which is subsequently supplied thereto. The production of the longer-chain compounds in this manner is the subject of my concurrently filed application Serial No. 246,024, now Patent No. 3,234,294, and the reaction which is considered to take place is as follows:

Equation 2

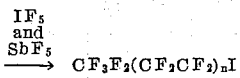

$$CF_3CF_2I + nCF_2=CF_2 \xrightarrow{IF_5 \text{ and } SbF_5} CF_3F_2(CF_2CF_2)_nI$$

Preferred reacting proportions for the present invention are about 0.5 mol of iodine pentafluoride per mol of 1,2-diiodotetrafluoroethane, while the amount of tetrafluoroethylene is about 1.5 (preferably an amount slightly in excess of 1.5) mols per mol of diiodide. These proportions provide approximately stoichiometric amounts according to Equation 1. The amount of catalyst used is very small, and a further discussion of such amounts will appear hereinafter.

All of the starting materials for this invention, with the exception of the diiodide, are commercially available. However, a method for the preparation of this compound is described in U.S. Patent 2,424,677. This patent discloses heating iodine and tetrafluoroethylene under pressure until all of the iodine is consumed. If a product of high purity is desired, distillation may be carried out to remove any unreacted iodine. This distillation step is preferably done under reduced pressure.

Antimony pentafluoride is considered to be the most efficient catalyst. In small-scale operations where the equipment will quickly remove the heat of reaction, the antimony pentafluoride catalyst is preferred. On the other hand, in instances where the heat of reaction might not be dissipated quite as readily, it is preferred to use antimony trifluoride and iodine since the reaction proceeds at a slower rate with this combination. The antimony pentafluoride is usually employed in an amount of about 0.01–0.2 mol per mol of 1,2-diiodotetrafluoroethane. A preferred range for the catalyst is 0.04–0.06 mol per mol of the diiodide.

When antimony trifluoride and iodine are used as the catalyst combination, the amount of antimony trifluoride used is generally in the range of about 0.01–0.1 mol per mol of 1,2-diiodotetrafluoroethane, and the amount of iodine is in the range of about 0.02–0.2 mol per mol of the 1,2-diiodotetrafluoroethane. A preferred range for the catalyst combination per mol of the diiodide is 0.01–0.02 mol of antimony trifluoride and 0.09–0.11 mol of iodine. It is also preferable to employ at least 2 mol proportions of iodine per mol of antimony trifluoride, and at the same time to keep the amount of iodine from exceeding 0.2 mol per mol of 1,2-diiodotetrafluoroethane. Evidence shows that the iodine is consumed during the reaction. Nevertheless, it is initially necessary when using antimony trifluoride. This fact leads to the speculation that iodine and the iodine pentafluoride present in the reaction system convert the antimony trifluoride to the pentafluoride. Once the reaction is initiated, there is no need for the further addition of catalyst.

The present process is carried out in closed systems under autogenous pressure, primarily because tetrafluoroethylene and perfluoroethyl iodide are low-boiling materials. Autoclaves are suitable for this purpose. Generally, pressure requirements will not exceed about 600 p.s.i.g. maximum. Iodine pentafluoride is somewhat corrosive, particularly if not dry, but steel, "Inconel," "Monel," "Hastelloy" and stainless steel are suitable metals of construction. The reactor should be provided with means for agitation, heating and cooling as well as the usual safety valves. The system should preferably be provided with means for adding reactants and removing end products during the course of the reaction.

On a small scale, the total amount of iodine pentafluoride, 1,2-diiodotetrafluoroethane and catalyst to be used can be placed in the reactor and heated to the reaction temperature, whereupon tetrafluoroethylene is added in small increments, say 5–10% of the total, until all of the tetrafluoroethylene has been introduced. The reactor may then be cooled and the reaction product recovered. Such a procedure is entirely suitable provided that the equipment is capable of removing the heat of reaction at a sufficient rate to prevent an excesive rise in temperature. However, it should be pointed out that the reaction is highly exothermic in its early stages, and it can be dangerous to have all of the diiodide initially present if the equipment is not capable of adequately handling the heat of reaction. This is particularly true in a large scale operation where the removal of the heat of reaction is more difficult. In instances where the heat cannot be removed at a sufficient rate, uncontrollable reactions can occur, producing extremely high temperatures and pressures which could rupture the reactor.

For these reasons, it is preferred to use a diluent in large-scale operations to dissipate some of the heat of reaction. Preferred diluents are the perfluoroalkyl iodides, especially perfluoroethyl iodide. The amount of diluent should be at least 5% by weight of the iodine pentafluoride present, and preferably it should be at least 10%. It is also preferred to add the 1,2-diiodotetrafluoroethane and the tetrafluoroethylene in increments to the other materials which are initially placed in the reactor. These increments can range from 1–10% of the total amount of diiodide and tetrafluoroethylene to be added. The weight ratio of the diiodide to olefin in each increment is preferably about 2.4–2.5:1. Of course the size of the increments will depend upon the efficiency of the equipment in removing heat, and it will be readily recognized that smaller increments provide for a safer reaction.

The recovery of the perfluoroethyl iodide from the reaction mixture is a relatively simple matter. The iodide is readily vaporized from the reaction mass, leaving the catalyst and other residues behind. If a higher perfluoroalkyl iodide is used as a diluent in the reaction, the perfluoroethyl iodide (B.P. 13° C.) can be recovered by fractional distillation.

For a clearer understanding of the invention, the following specific examples are given. These examples are intended to be merely illustrative of the invention and not in limitation thereof. Unless otherwise specified, all parts are by weight.

Example I

A mixture of 22.2 parts (0.10 mol) of iodine pentafluoride and 2.2 parts (0.01 mol) of antimony pentafluoride was prepared at ambient temperature in a "Hastelloy-C" lined autoclave. The autoclave was then cooled below 0° C., evacuated, and 70.8 parts (0.20 mol) of 1,2-diiodotetrafluoroethane were added (0.5 mol IF$_5$/mol C$_2$F$_4$I$_2$, 0.05 mol SbF$_5$/mol C$_2$F$_4$I$_2$). The autoclave was heated slowly to 80° C. with agitation and then tetrafluoroethylene was added in small increments (7 each of 5 parts, 1 of 2 parts) until a total of 37 parts (0.37 mol, 1.85 mols/mol C$_2$F$_4$I$_2$) has been added. After each addition the temperature increased (7° to 27° C.) and the pressure increased. The temperature and pressure were allowed to return to approximately the initial values before the next addition was made. After 25 parts (0.25 mol) of tetrafluoroethylene had been added, the temperature increases were only minor. The final reaction pressure increased to 150 p.s.i.g., indicating the tetrafluoroethylene was not completely consumed. Reaction time 17 minutes.

The contents of the autoclave were then cooled and the liquid reaction product was analyzed by means of vapor phase chromatography, indicating 81.1 weight percent perfluoroethyl iodide and 16.2 weight percent 1,2-diiodotetrafluoroethane. No other products were found in concentrations higher than one percent. The indicated conversion of 1,2-diiodotetrafluoroethane was 70% and the yield of perfluoroethyl iodide was 86%.

The perfluoroethyl iodide was separated from the reaction mixture by gently heating and allowing the vapors of perfluoroethyl iodide to escape from the vessel into a refrigerated condenser where perfluoroethyl iodide was condensed and collected.

Example II

Example I was repeated using room temperature as the reaction temperature (19–26° C.). Temperature increases of 3° to 40° C. were observed during the tetrafluoroethylene addition. The reaction temperature was allowed to return to at least 26° before the next addition was made. Reaction time 25 minutes. The product contained 95.6 weight percent perfluoroethyl iodide, 1.1 weight percent 1,2-diiodotetrafluoroethane and 2.9 weight percent volatile products which were not identified. The conversion was 98% and the yield of perfluoroethyl iodide was 97%.

Example III

Example I was repeated at 60° C. using 0.5 part (0.0027 mol, 0.0113 mol/mol C$_2$F$_4$I$_2$) of antimony pentafluoride as catalyst. Reaction time 20 minutes. The product was analyzed as before and found to contain 91.9 weight percent perfluoroethyl iodide, 5.0 weight percent 1,2-diiodotetrafluoroethane, and 2.0 weight percent by-products. The conversion was 91% and the yield of perfluoroethyl iodide was 96%.

Example IV

A mixture of 24.4 parts iodine pentafluoride (0.11 mol) and 2.2 parts antimony pentafluoride (0.01 mol) was prepared in the autoclave of Example I. The autoclave was cooled below 0° C., evacuated, and 70.8 parts (0.20 mol) of 1,2-diiodotetrafluoroethane were added (0.55 mol IF$_5$/mol C$_2$F$_4$I$_2$, 0.05 mol SbF$_5$/mol C$_2$F$_4$I$_2$). The autoclave was heated to 60° C. and tetrafluoroethylene was added in 5-part increments until a total of 55 parts (0.55 mol, 2.75 mols/mol C$_2$F$_4$I$_2$) has been added. The reaction was strongly exothermic during the early portion of the addition and mildly exothermic during the latter portion. The reaction pressure increased from an initial 100 p.s.i.g. to a final 160 p.s.i.g. The product was analyzed by vapor phase chromatography, indicating 83.2 weight percent perfluoroethyl iodide, 6.7 weight percent perfluorobutyl iodide, 3.2 weight percent perfluorohexyl iodide, 1.8 weight percent perfluorooctyl iodide, 1.2 weight percent perfluorodecyl iodide, 0.9 weight percent perfluorododecyl iodide, 0.5 weight percent perfluorotetradecyl iodide, and 2.2 weight percent noncondensibles, probably nitrogen, tetrafluoroethylene and/or perfluoroethane. No 1,2-diiodotetrafluoroethane was found, hence the conversion was 100%. The yield of perfluoroalkyl iodides was 92%.

The reaction product was washed with water to remove the iodine pentafluoride and antimony pentafluoride by hydrolysis. The organic products were recovered by fractional distillation of the washed product.

Example V

A mixture of 22.2 parts (0.10 mol) of iodine pentafluoride, 1.27 parts (0.005 mol) of iodine and 0.5 part (0.0028 mol) of antimony trifluoride was prepared in the autoclave of Example I. After cooling to below 0° C., the autoclave was evacuated and 70.8 parts (0.20 mol) of 1,2-diiodotetrafluoroethane were added (0.5 mol IF$_5$/mol C$_2$F$_4$I$_2$, 0.014 mol SbF$_3$/mol C$_2$F$_4$I$_2$, 0.025 mol I$_2$/mol C$_2$F$_4$I$_2$). The autoclave was heated to 80° C. and tetrafluoroethylene was added in six portions of 5 parts each and one portion of 4 parts until a total of 34 parts (0.34 mol, 1.7 mols/mol C$_2$F$_4$I$_2$) had been added. Temperature increases of 3° to 37° C. were observed. The reaction time was 25 minutes. From the reaction mixture were recovered 4 parts tetrafluoroethylene, 0.8 part perfluoroethane, and 104 parts of perfluoroethyl iodide. No 1,2-diiodotetrafluoroethane was found. The yield of perfluoroethyl iodide was 85%.

The above experiment was repeated omitting the 1.27 parts of iodine. Essentially no reaction occurred after 90 minutes heating. The product contained 0.5% perfluoroethyl iodide and 99.5% 1,2-diiodotetrafluoroethane.

Example VI

A mixture of 29.3 parts (0.132 mol) of iodine pentafluoride, 0.5 part (0.0028 mol) of antimony trifluoride, and 5.08 parts (0.02 mol) of iodine was prepared in the autoclave of Example I. After cooling below 0° C., the autoclave was evacuated and 70.8 parts (0.20 mol) of 1,2-diiodotetrafluoroethane were added (0.66 mol IF$_5$/mol C$_2$F$_4$I$_2$, 0.014 mol SbF$_3$/mol C$_2$F$_4$I$_2$, 0.1 mol I$_2$/mol C$_2$F$_4$I$_2$). After heating the autoclave to 80° C., tetrafluoroethylene was added in 5-part increments as before until a total of 78 parts were added (0.78 mol, 3.9 mols/mol C$_2$F$_4$I$_2$). Temperature increases of 4° to 15° C. were observed. Tetrafluoroethylene additions were terminated by choice. Reaction time 22 minutes. From the reaction mass were isolated 2 parts perfluoroethane, 22.5 parts perfluorobutyl iodide, 90 parts perfluoroethyl iodide, 18.8 parts perfluorohexyl iodide, 15.5 parts perfluorooctyl iodide, 11.0 parts perfluorodecyl iodide, 7.2 parts perfluorododecyl iodide, 3.5 parts perfluorotetradecyl iodide. No 1,2-diiodotetrafluoroethane was found. Conversion was 100%. The yield of perfluoroalkyl iodides was 81%.

*Example VII*

A mixture of 5216.3 parts (23.5 mol) of iodine pentafluoride, 86.2 parts (0.482 mol) of antimony trifluoride and 1088.6 parts (4.287 mol) of iodine was prepared at ambient temperature in a stainless steel autoclave. The autoclave was flushed with nitrogen and 449.1 parts (1.826 mol) of perfluoroethyl iodide was added as reaction solvent and moderator. The autoclave was heated slowly to about 70° C. with agitation and 567.0 parts of 1,2-diiodotetrafluoroethane was added, followed by 226.7 parts of tetrafluoroethylene. The reaction was exothermic and required cooling water on the autoclave jacket. The reactor temperature was maintained at 65–75° C. with cooling during the reaction. After the reaction slowed down, increments of 1,2-diiodotetrafluoroethane and tetrafluoroethylene were added consisting of 567.0 parts of the former and 226.7 parts of the latter until a total of 15172.6 parts of 1,2-diiodotetrafluoroethane (42.88 mols) and 7484.3 parts of tetrafluoroethylene (74.84 mols) had been added. The final reaction pressure was 92 p.s.i.g. The reaction time was 3 hours. The ratios of reactants were as follows: mols IF$_5$/mols C$_2$F$_4$I$_2$=0.548; mols SbF$_3$/mols C$_2$F$_4$I$_2$=0.0112; mols I$_2$/mols C$_2$F$_4$I$_2$=0.10; mols C$_2$F$_5$I/mols C$_2$F$_4$I$_2$=0.0426.

The product perfluoroethyl iodide was distilled from the autoclave into a cylinder cooled to less than 0° C. giving 29392.8 parts of product which contained 97.4% by weight perfluoroethyl iodide and 0.2% 1,2-diiodotetrafluoroethane. Other unidentified products were present in small amounts. A residue (472.1 parts) remained in the autoclave which consisted of 92.6% by weight 1,2-diiodotetrafluoroethane and 5% by weight perfluoroethyl iodide. The conversion of 1,2-diiodotetrafluoroethane was 98.3% and the yield of perfluoroethyl iodide was 97.6%.

The following example illustrates the importance of the catalyst by showing what happens when the catalyst is omitted.

*Example VIII*

The experiment of Example V was repeated omitting both the 1.27 parts of iodide and 0.5 part of antimony trifluoride. The resulting mixture, consisting essentially of iodine pentafluoride and 1,2-diiodotetrafluoroethane with one 5-part increment of tetrafluoroethylene was heated at 80° C. for ninety minutes. Essentially no reaction occurred; the product contained 99.2% by weight 1,2-diiodotetrafluoroethane and 0.16% by weight perfluoroethyl iodide. Hence the catalyst used in the present process is essential to obtaining high conversions in reasonable reaction times.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the production of perfluoroethyl iodide comprising reacting in a closed reaction zone, at 0°–120° C., 1,2-diiodotetrafluoroethane, iodine pentafluoride, and tetrafluoroethylene in the presence of a small amount of a catalyst selected from the group consisting of (1) antimony pentafluoride, and (2) a combination of antimony trifluoride and iodine, said antimony compounds being present in an amount of at least 0.01 mol per mol of 1,2-diiodotetrafluoroethane, and the amount of iodine being about 0.02–0.2 mol per mol of 1,2-diiodotetrafluoroethane.

2. The process of claim 1 wherein the reaction temperature is 60°–80° C.

3. A process for the production of perfluoroethyl iodide comprising reacting in a closed reaction zone at 0°–120° C., 1,2-diiodotetrafluoroethane, iodine pentafluoride, and tetrafluoroethylene in the presence of a small amount of a catalyst selected from the group consisting of (1) antimony pentafluoride and (2) a combination of antimony trifluoride and iodine, the proportions of the reactants being about 0.5 mol of iodine pentafluoride and about 1.5 mols of tetrafluoroethylene per mol of 1,2-diiodotetrafluoroethane, said antimony compounds being present in an amount of at least 0,01 mol per mol of 1,2-diiodotetrafluoroethane and the amount of iodine being about 0.02–0.2 mol per mol of 1,2-diiodotetrafluoroethane.

4. The process of claim 3 wherein the reaction temperature is 60°–80° C. and the catalyst is antimony pentafluoride in an amount of 0.01–0.2 mol per mol of 1,2-diiodotetrafluoroethane.

5. The process of claim 3 wherein the reaction temperature is 60°–80° C. and the catalyst is a combination of antimony trifluoride and iodide, the amount of antimony trifluoride being in the range of about 0.01–0.1 mol per mol of 1,2-diiodotetrafluoroethane, and the amount of iodine being in the range of about 0.09–0.011 mol per mol of 1,2-diiodotetrafluoroethane.

6. A process for preparing perfluoroethyl iodide comprising adding incremental amounts of between 1% and 10% of the total, of 1,2-diiodotetrafluoroethane and tetrafluoroethylene to a reaction zone at 0°–120° C. containing iodine pentafluoride, and as a diluent a perfluoroalkyl iodide and a catalyst selected from the group consisting of (1) antimony pentafluoride and (2) a combination of antimony trifluoride and iodine, said perfluoroalkyl iodide being present in an amount equal to at least 5% by weight of the iodine pentafluoride and the total amount of reactants being in the ratio of about 0.5 mol of iodine pentafluoride and about 1.5 mols of tetrafluoroethylene per mol of 1,2-diiodotetrafluoroethane, said antimony compounds being present in an amount of at least 0.01 mol per mol of 1,2-diiodotetrafluoroethane, and the amount of iodine being about 0.02–0.2 mol per mol of 1,2-diiodotetrafluoroethane.

7. The process of claim 6 wherein the temperature is 60°–80° C. and the catalyst is antimony trifluoride and iodine, the amount of antimony trifluoride being 0.01–0.02 mol per mol of 1,2-diiodotetrafluoroethane and the amount of iodine being 0.09–0.11 mol per mol of 1,2-diiodotetrafluoroethane.

References Cited by the Examiner

UNITED STATES PATENTS 3,006,973   10/1961   Hauptschein et al. __ 260—653.8

OTHER REFERENCES

Haszeldine et al.: J. Chem. Soc. 1953, 1548–1552 cited, in Muller, Arbeitsmethoden der Organischen Chemie, vol. V/3, page 80 (1953).

LEON ZITVER, *Primary Examiner.*

D. D. HORWITZ, *Assistant Examiner.*